May 14, 1946. R. B. DAY ET AL 2,400,194
METHOD FOR CONTACTING FLUIDS WITH FINELY DIVIDED SOLID PARTICLES
Filed Sept. 30, 1943
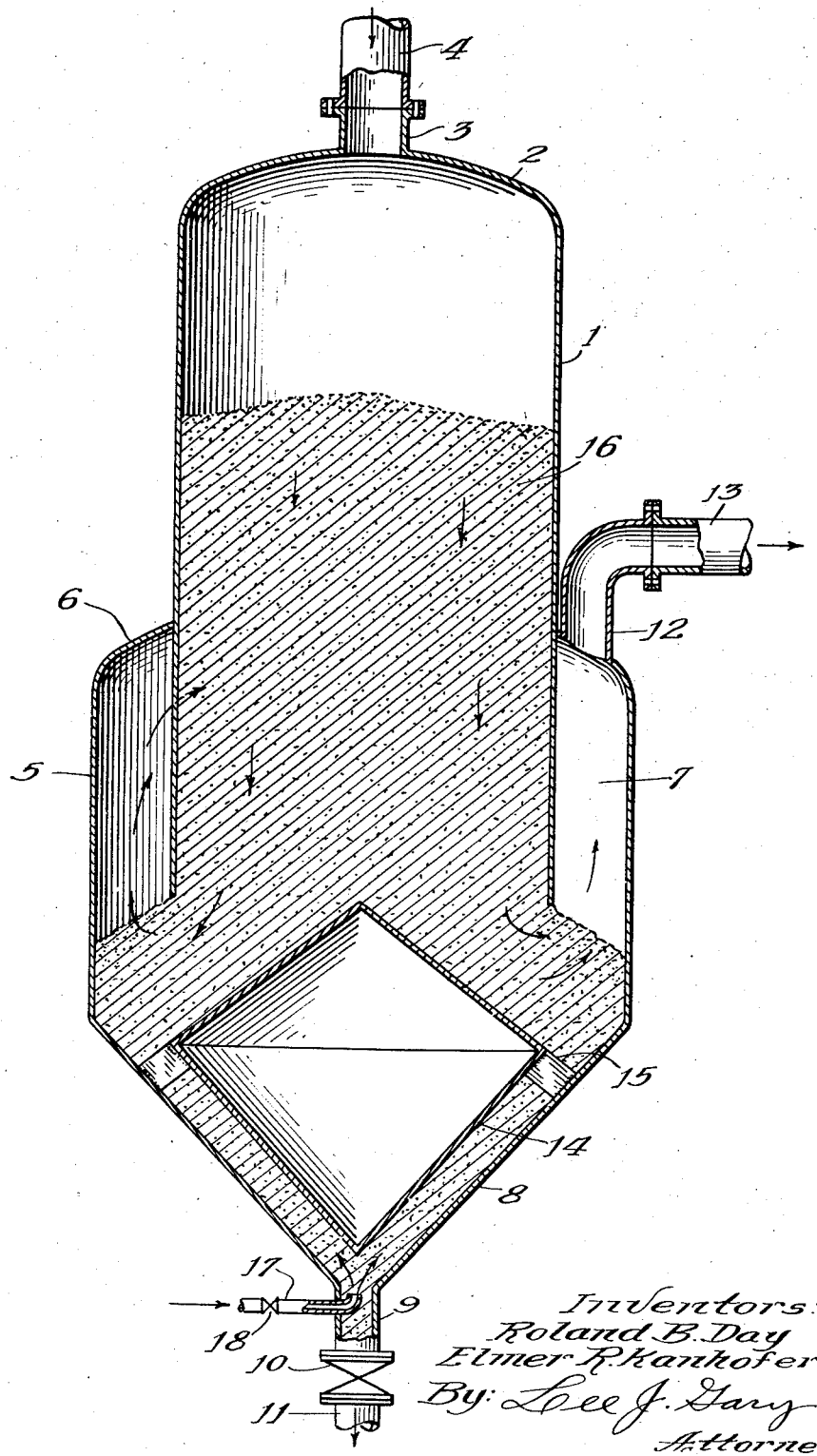
Inventors:
Roland B. Day
Elmer R. Kankofer
By: Lee J. Gary
Attorney Patented May 14, 1946

2,400,194

UNITED STATES PATENT OFFICE 2,400,194

METHOD FOR CONTACTING FLUIDS WITH FINELY DIVIDED SOLID PARTICLES

Roland B. Day and Elmer R. Kanhofer, Riverside, Ill., assignors to Universal Oil Products Company, Chicago, Ill., a corporation of Delaware Application September 30, 1943, Serial No. 504,454

3 Claims. (Cl. 196—52)

This invention relates to an improved method and means for contacting finely divided solids with fluids and more particularly to the conversion of hydrocarbon oils with finely divided solid catalyst particles.

The present invention is adapted for use in many processes and will be found particularly advantageous when employed in various hydrocarbon conversion reactions such as catalytic cracking, catalytic dehydrogenation, catalytic aromatization, catalytic reforming, and the like.

One of the features of our invention is a means of obtaining efficient contacting of fluids with finely divided solid particles.

Another feature of our invention is the provision for effectively separating the contacted fluid from the solid particles.

Another feature of the invention is a means for selectively controlling operating variables; for example, catalyst circulation rate.

Broadly, the invention comprises a process which involves contacting a fluid with a mass of subdivided solid particles wherein a continuous compact bed of solid particles is maintained within a confined reaction zone from adjacent its upper extremity to its lower extremity, causing the particles of said bed to move downward through the reaction zone by continuously supplying particles to the upper portion of the bed and continuously removing particles from the lower portion of the bed, supplying a stream of said fluid to the upper portion of the reaction zone and passing the fluid downwardly through an upper portion of said bed, reversing the direction of flow of said fluid in an enlarged lower portion of said bed and discharging fluid upwardly from the enlarged portion of said bed.

In a more limited embodiment, the invention comprises maintaining a continuous compact bed of solid particles within a confined reaction zone from adjacent its upper extremity to its lower extremity, causing the particles of said bed to move downwardly through the reaction zone by continuously supplying particles to the upper portion of the bed and continuously removing particles from the lower portion of the bed, supplying a stream of fluid admixed with said particles to the upper portion of the reaction zone and passing said fluid downwardly through an upper portion of said bed, providing a region of enlarged horizontal cross-section in the lower portion of said reaction zone and bed relative to that in said upper portion of the bed, causing a reversal in the direction of flow of said fluid in the enlarged lower portion of the bed and discharging fluid upwardly from the latter.

In order to more clearly illustrate these and additional advantages of the invention, reference is made to the accompanying diagrammatic drawing showing a sectional elevational view of one form of apparatus suitable for conducting the process of the invention and the following description thereof.

Referring to the drawing, I denotes an elongated vertically disposed shell which forms the main body of the reactor and is closed at its upper extremity by head 2. Head 2 is provided with flanged opening 3 to which may be connected inlet conduit 4 by suitable bolts not shown. Circumscribing the lower portion of shell I is a somewhat larger shell 5. Shell 5 is joined to shell I by a closure member 6, thus forming an annular-shaped chamber 7 surrounding the lower portion of the main body of the reactor. Shell 5 is closed at its lower end by conical head 8 which is provided with a flanged outlet opening 9 to which is connected by suitable bolts not shown, a suitable valve 10. Valve 10 may be a gate valve, adjustable orifice or slide valve, and controls the withdrawal of finely divided solid particles from the reactor, the withdrawn particles then being conducted through conduit 11 to any other desired processing equipment. Outlet opening 12 is provided in closure member 6 in communication with annular-shaped chamber 7. Outlet opening 12 may be connected with conduit 13 by suitable bolts not shown. Within the lower portion of the vessel is positioned a double cone-shaped member 14 which is supported from and secured to member 8 by means of web-shaped members 15.

In order to better illustrate the invention, its operation in connection with a catalytic cracking process will hereinafter be described.

Incoming hydrocarbon vapors commingled with suitable cracking catalysts are introduced through conduit 4, the catalyst particles accumulating and forming a compact bed 16 within the reactor. The withdrawal of particles from this bed by means of valve 10 is so controlled that the desired catalyst residence time is maintained in the reactor and the hydrocarbon vapors pass downwardly through the catalyst bed until they reach the region of greater cross-sectional area which is just below the lower end of shell I. Below the bottom of shell I the flow of hydrocarbon vapors and reaction products will be reversed in direction and they will leave the catalyst bed and pass into annular-shaped chamber 7. From annular-shaped chamber 7, the reaction products will be withdrawn through flange opening 12 and conduit 13 to be supplied to suitable separation and recovery equipment not shown.

The catalyst particles in their downward passage through the reaction zone will accumulate deleterious deposits which affect their activity and will be withdrawn through valve 10 and conduit 11 to be supplied to suitable reactivation equipment. This reactivation equipment may be another vessel similar to that already illustrated or it may comprise a regenerator operating on the so-called "fluidized" process principle. A system similar to the latter is illustrated in our co-pending application 495,250, filed July 19, 1943.

In order to prevent the removal of hydrocarbons with the catalyst particles, a suitable stripping medium such as steam, nitrogen, flue gas, and the like, is introduced through line 17, controlled by valve 18, into the lower portion of the reactor.

In the apparatus of our invention, there is very little catalyst which is not being contacted by the hydrocarbon vapors. This is due to the positioning in the lower portion of the reactor of member 14 which acts as a filler and diverting means to direct hydrocarbon vapors toward annular chamber 7 and catalyst particles toward outlet opening 9.

Although the above example illustrates the use of our invention in connection with catalytic cracking it is not to be limited thereto but may be advantageously applied to many other processes as hereinbefore stated.

The various catalysts and conditions suitable for use in the several processes which come within the scope of the invention are well known in the art and therefore have not been described in detail herein.

We claim as our invention:

1. A method for reacting a fluid in contact with a mass of subdivided solid particles which comprises maintaining a continuous compact bed of said solid particles under reaction conditions within a confined reaction zone from adjacent its upper extremity to its lower extremity, causing the particles of said bed to move downwardly through the reaction zone by continuously supplying particles to the upper portion of the bed and continuously removing particles from the lower portion of the bed, supplying a stream of said fluid to the upper portion of the reaction zone and reacting the fluid while passing downwardly through an upper portion of said bed, reversing the direction of flow of said fluid in a horizontally enlarged lower portion of said bed and discharging fluid upwardly from the enlarged portion of said bed.

2. A method of reacting a fluid in contact with a mass of subdivided solid particles which comprises maintaining a continuous compact bed of solid particles under reaction conditions within a confined reaction zone from adjacent its upper extremity to its lower extremity, causing the particles of said bed to move downwardly through the reaction zone by continuously supplying particles to the upper portion of the bed and continuously removing particles from the lower portion of the bed, supplying a stream of said fluid admixed with said solid particles to the upper portion of the reaction zone and reacting said fluid while passing downwardly through an upper portion of said bed, providing a region of enlarged horizontal cross section in the lower portion of said reaction zone and bed relative to that in said upper portion of the bed, causing a reversal in the direction of flow of said fluid in the enlarged lower portion of the bed and discharging fluid upwardly from the latter.

3. A process for the conversion of hydrocarbons which comprises maintaining a continuous compact bed of catalyst within a confined reaction zone from adjacent its upper extremity to its lower extremity, maintaining said bed at conversion conditions, causing the catalyst of said bed to move downwardly through the reaction zone by continuously supplying fresh catalyst to the upper portion of the bed and continuously removing contaminated catalyst from the lower portion of the bed, supplying a stream of hydrocarbons to the upper portion of the reaction zone and passing the same downwardly through an upper portion of said bed, providing a region of enlarged horizontal cross section in the lower portion of said reaction zone and bed relative to said upper portion of the bed, causing a reversal in the direction of flow of the hydrocarbons in the enlarged lower portion of the bed and discharging conversion products upwardly from the latter.

ROLAND B. DAY.
ELMER R. KANHOFER.